(12) United States Patent
Yoshikawa et al.

(10) Patent No.: US 10,632,671 B2
(45) Date of Patent: Apr. 28, 2020

(54) POWDER COMPRISING PVA RESIN PARTICLES FOR LAYER MANUFACTURING AND LAYERED SHAPED ARTICLE

(71) Applicants: Noritake Co., Limited, Nagoya-shi (JP); Roland DG Corporation, Hamamatsu-shi (JP)

(72) Inventors: Daishi Yoshikawa, Nisshin (JP); Fumiyoshi Iwase, Hamamatsu (JP)

(73) Assignees: Noritake Co., Limited, Nagoya-shi (JP); Roland DG Corporation, Hamamatsu-Shi (JP)

( * ) Notice: Subject to any disclaimer, the term of this patent is extended or adjusted under 35 U.S.C. 154(b) by 306 days.

(21) Appl. No.: 15/849,322

(22) Filed: Dec. 20, 2017

(65) Prior Publication Data

US 2018/0297277 A1 Oct. 18, 2018

(30) Foreign Application Priority Data

Apr. 13, 2017 (JP) ................... 2017-080083

(51) Int. Cl.
| | | |
|---|---|---|
| *B32B 5/16* | (2006.01) | |
| *B29C 64/165* | (2017.01) | |
| *B22F 1/00* | (2006.01) | |
| *C09J 129/04* | (2006.01) | |
| *C22C 1/04* | (2006.01) | |
| *B22F 3/00* | (2006.01) | |
| *B33Y 70/00* | (2020.01) | |
| *B33Y 80/00* | (2015.01) | |
| *C09D 129/04* | (2006.01) | |
| *B22F 3/105* | (2006.01) | |

(52) U.S. Cl.
CPC .......... *B29C 64/165* (2017.08); *B22F 1/0007* (2013.01); *B22F 1/0011* (2013.01); *B22F 1/0059* (2013.01); *B22F 3/008* (2013.01); *B33Y 70/00* (2014.12); *B33Y 80/00* (2014.12); *C09D 129/04* (2013.01); *C09J 129/04* (2013.01); *C22C 1/0416* (2013.01); *C22C 1/0433* (2013.01); *C22C 1/0458* (2013.01); *C22C 1/0483* (2013.01); *B22F 3/1055* (2013.01); *B22F 2301/052* (2013.01); *B22F 2301/15* (2013.01); *B22F 2301/205* (2013.01); *B22F 2301/30* (2013.01); *B22F 2301/35* (2013.01); *B22F 2302/45* (2013.01); *B22F 2304/10* (2013.01); *B22F 2999/00* (2013.01); *C09J 2429/00* (2013.01)

(58) Field of Classification Search
CPC ...... B22F 1/0062; C09D 129/04; B33Y 70/00
USPC ........................................................ 428/407
See application file for complete search history.

(56) References Cited

U.S. PATENT DOCUMENTS

| | | | |
|---|---|---|---|
| 6,610,429 B2 | 8/2003 | Bredit et al. | |
| 2006/0208388 A1 | 9/2006 | Bredt et al. | |
| 2015/0210016 A1 | 7/2015 | Okamoto | |
| 2015/0218360 A1 | 8/2015 | Barber et al. | |
| 2016/0040025 A1* | 2/2016 | Norikane | C09D 103/02 106/157.2 |
| 2016/0271879 A1* | 9/2016 | Yamashita | B22F 3/003 |
| 2016/0339602 A1 | 11/2016 | Kato et al. | |

FOREIGN PATENT DOCUMENTS

| | | |
|---|---|---|
| JP | 3607300 B2 | 1/2005 |
| JP | 4624626 B2 | 2/2011 |
| JP | 5589817 B2 | 9/2014 |
| JP | 2016-172416 A | 9/2016 |
| JP | 2016-172429 A | 9/2016 |
| WO | WO-98/09798 A1 | 3/1998 |
| WO | WO-01/34371 A1 | 5/2001 |

OTHER PUBLICATIONS

Universal Selector, Kuraray Poval PVA-205, Technical DataSheet (2019) (Year: 2019).*
"U.S. Appl. No. 15/077,270, Non-Final Office Action dated Jan. 26, 2018", 13 pgs.
"Japanese Application Serial No. 2017080083, Final Office Action dated Mar. 15, 2018", (w/ English Translation), 6 pgs.
"Japanese Application Serial No. 2017080083, Office Action dated Aug. 31, 2017", (w/ English Abstract), 9 pgs.

* cited by examiner

*Primary Examiner* — Hoa (Holly) Le
(74) *Attorney, Agent, or Firm* — Schwegman Lundberg & Woessner, P.A.

(57) ABSTRACT

The present invention provides a powder for layer manufacturing including non-hydratable matrix particles, and water-soluble adhesive particles. The powder for layer manufacturing includes, as the water-soluble adhesive particles, polyvinyl alcohol resin particles with a saponification degree of 86.5 mol % to 89.0 mol %, an average degree of polymerization of 400 to 600, a viscosity of a 4 mass % aqueous solution at 20° C. of 4.6 mPa to 5.4 mPa, and an average particle diameter of 20 μm to 60 μm.

6 Claims, No Drawings

POWDER COMPRISING PVA RESIN PARTICLES FOR LAYER MANUFACTURING AND LAYERED SHAPED ARTICLE

CROSS-REFERENCE

This application claims the benefit of priority under 35 U.S.C. § 119 to Japanese Patent Application No. 2017-080083 filed on Apr. 13, 2017, the entire contents of which are incorporated herein by reference.

BACKGROUND OF THE INVENTION

1. Field of the Invention

The present invention relates to a powder for layer manufacturing and a layered shaped article.

2. Description of the Related Art

Additive manufacturing (three-dimensional manufacturing), in which a powder solidified layer having a predetermined cross-sectional shape is formed by bonding a powder material with a binder and a shaped article having a desired three-dimensional shape is formed by sequentially laminating such powder solidified layers, is known. Resin products are widely manufactured by the additive manufacturing using resin materials due to high handleability thereof. However, in the additive manufacturing (powder layer manufacturing) using powder materials, powder materials made of ceramic materials, which are difficult to precisely process after shaping, are also widely used. In a known method for bonding a powder material, a water-soluble adhesive (binder) is mixed in advance with the powder material, a shaping liquid (for example, water) is locally supplied from a supply head to a target position on the powder material stored in a shaping tank, and the water-soluble adhesive in the powder material is locally dissolved, followed by solidification (see, for example, Japanese Patent Nos. 3607300, 5589817, and 4624626).

SUMMARY OF THE INVENTION

In recent years, a demand has been created for a higher strength of layered shaped articles using powder materials such as ceramics, so that the as-manufactured shaped article could be taken out from the shaping apparatus without damage. For this reason, a powder for layer manufacturing capable of realizing a shaped article of higher strength is needed. Further, when a water-soluble adhesive is mixed with a powder material and the mixture is stored under high temperature and high humidity, the water-soluble adhesive absorbs moisture and the shaping powder may solidify in some cases. When such a solidification phenomenon of the shaping powder takes place in the shaping apparatus, the powder can adhere to and solidify on the inner wall of, for example, a powder tank, a suction hose, a filter, or a shaping table, causing clogging of powder or deformation of the shaped article. For this reason, there is a demand for powders for layer manufacturing that are resistant to moisture absorption and solidification and have good moisture resistance.

Japanese Patent No. 3607300 discloses a technique for strengthening a final product by using a particle mixture including reinforcing fibers such as cellulose. However, even when such a technique is used, since a shaped body is formed through a complex reaction, depending on compounding, sufficient strength may not be obtained immediately after shaping. Further, Japanese Patent No. 5589817 discloses a technique for improving the flatness of a powder material used for layer manufacturing by providing fluidity such that the total energy amount is measured in a specific range by powder rheometer measurements. However, it is impossible to obtain a high-strength layered shaped article as described above and to improve moisture resistance by focusing attention only on the fluidity of the powder material.

The present invention has been created with the foregoing in view, and it is a main object thereof to provide a powder for layer manufacturing which has a satisfactory moisture resistance and which is suitable for manufacturing a layered shaped article of higher strength. Another related object is to provide a high-strength layered shaped article which is shaped using such a powder for layer manufacturing.

A powder for layer manufacturing is provided according to the present invention to achieve the above object. The powder for layer manufacturing disclosed herein includes non-hydratable matrix particles, and water-soluble adhesive particles. The powder for layer manufacturing includes, as the water-soluble adhesive particles, polyvinyl alcohol resin particles with a saponification degree of 86.5 mol % to 89.0 mol %, an average degree of polymerization of 400 to 600, a viscosity of a 4 mass % aqueous solution at 20° C. of 4.6 mPa to 5.4 mPa, and an average particle diameter of 20 pin to 60 µm. With such a powder for layer manufacturing, it is possible to achieve both the strength and the moisture resistance of the layered shaped article at a higher level.

In a preferred aspect of the powder for layer manufacturing disclosed herein, the average particle diameter of the non-hydratable matrix particles is 1 µm to 50 µm. With the powder for layer manufacturing including such non-hydratable matrix particles, shaped articles of a higher strength can be stably realized.

In a preferred aspect of the powder for layer manufacturing disclosed herein, when the total mass of the powder for layer manufacturing is 100 parts by mass, the content of the water-soluble adhesive particles is 1 part by mass to 20 parts by mass. With such a ratio of the content of water-soluble adhesive particles, the above-mentioned effect can be more advantageously exhibited.

In a preferred aspect of the powder for layer manufacturing disclosed herein, the non-hydratable matrix particles are constituted mainly by a metal including at least one element selected from the group consisting of Al, Zr, Ti, Zn, Ni, and Fe or an alloy thereof. Metals or alloys including these elements can effectively contribute to the improvement of the strength of the layered shaped article.

In a preferred aspect of the powder for layer manufacturing disclosed herein, non-hydratable matrix particles are constituted mainly by an oxide including at least one element selected from the group consisting of Al, Zr, Ti, Zn, Ni, Fe, and Si. Oxides including these metal elements or metalloid elements can effectively contribute to the improvement of the strength of the layered shaped article.

The present invention also provides a layered shaped article formed of a solidified product of any of the powders for layer manufacturing disclosed herein. Since this layered shaped article is shaped using the above-mentioned powder for layer manufacturing, the layered shaped article can be superior in mechanical strength and dimensional stability to the conventional layered shaped articles.

DETAILED DESCRIPTION OF THE INVENTION

Preferred embodiments of the present invention will be described hereinbelow. Incidentally, matters other than those particularly mentioned in the present specification and necessary for the implementation of the present invention can be understood as design matters for a person skilled in the art which are based on the related art in the pertinent field. The present invention can be carried out based on the contents disclosed in this specification and common technical sense in the pertinent field. In this specification, A to B means A or more and B or less.

Water-Soluble Adhesive Particles

The powder for layer manufacturing disclosed herein includes water-soluble adhesive particles made of a polyvinyl alcohol (PVA) resin. Here, the term "water-soluble adhesive particles" refers to resin particles such that when 2 parts by mass of the adhesive particles are added to 100 parts by mass of water at a liquid temperature of 90° C. and stirred for 4 h to dissolve all or some of the adhered particles, the aqueous solution in which the adhesive particles are dissolved demonstrates a viscidity higher than that of water. In a preferred embodiment, the viscidity is demonstrated such that when the viscosity of the water is A (mPa·s), the viscosity of the aqueous solution in which the adhesive particles are dissolved is more than 1.2×A (preferably 1.5× A, more preferably 2.0×A). The water-soluble adhesive particles are a component that dissolves in water when admixed with water-containing shaping liquid and bonds the below-described non-hydratable matrix particles to each other.

Typically, the polyvinyl alcohol (PVA) resin constituting the water-soluble adhesive particles is a resin including a vinyl alcohol unit as a main repeating unit.

A partially saponified product having a saponification degree of 86.5 mol % or more can be preferably used as the PVA resin. The PVA resin having a higher degree of saponification is lower in hygroscopicity and effectively improves the moisture resistance of the powder for layer manufacturing. Therefore, it is possible to stably form a layered shaped article. From the viewpoint of moisture resistance and the like, the saponification degree of the PVA resin is preferably 86.8 mol % or more, more preferably 87 mol % or more, and still more preferably 87.2 mol % or more. In one preferred embodiment, the saponification degree of the PVA resin may be 87.5 mol % or more, for example, 87.8 mol % or more. Further, the saponification degree of the PVA resin is typically 89.0 mol % or less. From the viewpoint of, for example, obtaining a layered shaped article of higher strength, the saponification degree of the PVA resin is preferably 88.8 mol % or less, more preferably 88.5 mol % or less, and still more preferably 88.2 mol % or less. The technique disclosed herein can be advantageously implemented, for example, in a mode in which the saponification degree of the PVA resin is 86.5 mol % or more and 89.0 mol % or less (typically 87.0 mol % or more and 89.0 mol % or less). In the present specification, the "degree of saponification" means a proportion (percentage) of vinyl alcohol units to the total number of moles of vinyl alcohol units and structural units (typically vinyl ester units, such as vinyl acetate units) that can be converted into vinyl alcohol units by saponification, and a value obtained by the measurement according to JIS K 6726-1994 can be used.

The average degree of polymerization of the PVA resin is typically 400 or more. From the viewpoint of, for example, improving moisture resistance of the powder, the average degree of polymerization of the PVA resin is preferably 420 or more, more preferably 440 or more, still more preferably 460 or more, and particularly preferably 480 or more. For example, the average degree of polymerization of the PVA resin may be 500 or more, and typically 520 or more. The average degree of polymerization of the PVA resin is typically 600 or less. From the viewpoint of, for example, shaping a layered shaped article of higher strength, the average degree of polymerization of the PVA resin is preferably 580 or less and more preferably 560 or less. The technique disclosed herein can be advantageously implemented, for example, in a mode in which the average degree of polymerization of the PVA resin is 400 or more and 600 or less (more preferably 480 or more and 580 or less, for example, 500 or more and 550 or less). In this specification, a value obtained by measurement according to JIS K 6726-1994 can be used as the average degree of polymerization.

A resin having a viscosity of a 4 mass % aqueous solution (that is, a viscosity at a concentration of 4%) at 20° C. of 4.6 mPa or more can be advantageously used as the PVA resin. For example, the viscosity of the PVA resin may be 4.8 mPa or more, and typically 5 mPa or more. Also, the viscosity of the PVA resin can typically be 5.4 mPa or less. In a preferred embodiment, the viscosity of the PVA resin may be 5.2 mPa or less, for example, 5.1 mPa or less. In the powder for layer manufacturing including a PVA resin capable of exhibiting such a viscosity, the effect of improving the strength of the layered shaped article and the effect of improving the powder moisture resistance can be exerted more advantageously. In this specification, a value obtained by measurement according to JIS K 6726-1994 using a B type viscometer (rotational viscometer method) can be used as the viscosity of a 4 mass % aqueous solution at 20° C.

The PVA resin may include an alkali metal salt of a carboxylic acid (for example, sodium acetate) as an impurity, but from the viewpoint of moisture resistance and the like, the content thereof is preferably 3 mass % or less, more preferably 2 mass % or less, and still more preferably 1 mass % or less. For example, the content of an alkali metal salt of a carboxylic acid in the PVA resin may be 0.5 mass % or less, and typically 0.2 mass % or less.

The shape (outer shape) of the PVA resin is typically particulate. The average particle diameter of the PVA resin particles is approximately 60 μm or less. From the viewpoint of, for example, obtaining a layered shaped article with higher strength, the average particle diameter of the PVA resin particles is preferably 58 μm or less, and more preferably 56 μm or less. Further, from the viewpoint of, for example, improving the moisture resistance of the powder for layer manufacturing, the average particle diameter of the PVA resin particles is suitably 20 μm or more, typically 30 μm or more, such as 40 μm or more, preferably 48 μm or more, and more preferably 50 μm or more. For example, the average particle diameter of the PVA resin particles may be 52 μm or more, and typically may be 54 μm or more. The technique disclosed herein can be advantageously implemented, for example, in a mode in which the average particle diameter of the PVA resin particles is 20 μm or more and 60 μm or less (for example, 50 μm or more and 58 μm or less).

In the present specification, the "average particle diameter" means, unless otherwise specified, a particle diameter at an integrated value of 50% in a particle size distribution measured by a particle size distribution measuring apparatus based on a laser scattering/diffraction method, that is, a 50% volume average particle diameter (D50 diameter). More specifically, the average particle diameter is a 50% volume average particle diameter measured by a dry method by using a particle size distribution measuring apparatus based on a laser scattering/diffraction method, without dispersing the particles, with compressed air.

The PVA resin particles disclosed herein can have low hygroscopicity as a result of the degree of saponification, the average degree of polymerization, the viscosity of the 4 mass % aqueous solution and the average particle diameter being set within the above ranges. Typically, when the resin powder formed of the PVA resin particles is subjected to a moisture resistance test under the following exposure conditions, and the resin powder after the moisture resistance test is classified under the following vibration conditions by using a test sieve with a mesh opening size of 300 μm, the mass proportion of the resin powder remaining on the sieve (=[(mass of the resin powder remaining on the sieve)/(total mass of the used resin powder)]×100) can be about 50% or less (for example, 1% to 50%), preferably 40% or less, and more preferably 30% or less. By using the PVA resin particles which are unlikely to absorb moisture even when exposed to such high temperature and high humidity and hardly agglomerate, it is possible to obtain both the strength and moisture resistance of the layered shaped article at a higher level.

[Exposure Conditions]
Exposure temperature: 40° C.
Relative humidity: 90%
Exposure time: 24 h
[Vibration Conditions]
Tester: Electric horizontal vibration machine
Frequency per minute: 60 times
Amplitude: 1 cm
Batting per minute: 120 times The content of the water-soluble adhesive particles in the powder for layer manufacturing is not particularly limited, but it is usually 1 part by mass or more when the total mass of the powder for layer manufacturing is 100 parts by mass. From the viewpoint of, for example, improving the mechanical strength of the layered shaped article, the content of the water-soluble adhesive particles is preferably 2 parts by mass or more, for example 4 parts by mass or more, typically 8 parts by mass or more. The upper limit of the content of the water-soluble adhesive particles is not particularly limited, but is, for example, 20 parts by mass or less, and from the viewpoint of, for example, improving the mechanical strength, is preferably 18 parts by mass or less, for example, 16 parts by mass or less, for example, 14 parts by mass or less, and typically 12 parts by mass or less.

Non-Hydratable Matrix Particles

The powder for layer manufacturing disclosed herein includes non-hydratable matrix particles. Here, the term "non-hydratable matrix particles" means a substance such that a hydration reaction (typically, hydrate formation or hydroxide formation) does not occur when water is brought into contact with the particles, or even when the hydration reaction occurs, the reaction is limited only to the microscopic range of the surface of the particles, and the particles mostly substantially do not react with water. Therefore, for example, when a trace amount (for example, 0.1 mol or less, preferably 0.01 mol or less, and more preferably 0.001 mol or less) of water molecules locally reacts with 1 mol of the non-hydratable matrix particles on the particle surface, this can also be included in the concept of non-hydratable matrix particles referred to herein. Typical examples of substances that cause a hydration reaction include plaster, cement and the like. The non-hydratable matrix particles are a component constituting the matrix of the layered shaped article which is to be manufactured.

The material and properties of the non-hydratable matrix particles are not particularly limited. For example, the non-hydratable matrix particles may be any of inorganic particles, organic particles and organic-inorganic composite particles. Inorganic particles are preferable, and particles made of a metal or semi-metal compound are particularly preferable as the non-hydratable matrix particles. For example, non-hydratable matrix particles constituted mainly by oxides, nitrides, carbides, and the like including any element belonging to groups 4 to 14 of the periodic table can be advantageously used. Among them, non-hydratable matrix particles constituted mainly by oxides, nitrides, carbides, and the like including any metal element or semimetal element among Al, Zr, Ti, Zn, Ni, Fe, and Si are preferred. Alternatively, non-hydratable matrix particles constituted mainly by a metal including any element belonging to groups 4 to 13 of the periodic table or an alloy thereof may be also used. Among these, non-hydratable matrix particles constituted mainly by a metal including any metal element among Al, Zr, Ti, Zn, Ni and Fe, or an alloy thereof are preferable.

Specific examples include non-hydratable matrix particles constituted mainly by any of oxide particles such as aluminum oxide (for example, alumina) particles, zirconium oxide (for example, zirconia) particles, titanium oxide (for example, titania) particles, silicon oxide (for example, silica) particles, zinc oxide particles, iron oxide particles, nickel oxide particles, cerium oxide (for example, ceria) particles, magnesium oxide (for example, magnesia) particles, chromium oxide particles, manganese dioxide particles, barium titanate particles, calcium carbonate particles and barium carbonate particles; metal particles such as aluminum particles, nickel particles and iron particles; nitride particles such as silicon nitride particles and boron nitride particles; and carbide particles such as silicon carbide particles and boron carbide particles. One type of non-hydratable matrix particles may be used alone, or two or more types may be used in combination. Among others, alumina particles, zirconia particles, titania particles, silica particles, zinc oxide particles, barium titanate particles, aluminum particles, nickel particles, and iron particles are preferable because they can form a layered shaped object having a high strength. Among these, alumina particles, zirconia particles, titania particles, and silica particles are more preferable, and alumina particles are particularly preferable.

In the present specification, the expression "constituted mainly by A" relating to the composition of the non-hydratable matrix particle means that the proportion of A (purity of A) in the non-hydratable matrix particle is 90% or more (preferably 95% or more, more preferably 97% or more, and even more preferably 98% or more, for example, 99% or more) on the mass standard.

The shape (outer shape) of the non-hydratable matrix particle is not particularly limited and may be spherical or non-spherical. From the viewpoints of mechanical strength, ease of production and the like, substantially spherical non-hydratable matrix particles can be preferably used.

The average particle diameter of the non-hydratable matrix particles is not particularly limited, but may be 1 μm or more and 50 μm or less. If the average particle diameter of the non-hydratable matrix particles is too large, the strength of the shaped article tends to decrease. From the viewpoint of, for example, obtaining a layered shaped article with higher strength, the average particle diameter of the non-hydratable matrix particles is preferably 40 μm or less, more preferably 30 μm or less, and particularly preferably 20 μm or less. Where the average particle diameter of the non-hydratable matrix particles is too small, the powder for layer manufacturing hardly flows, so that moldability when loading the powder in the form of a thin layer at the time of shaping may be deteriorated. From the viewpoint of moldability and the like, the average particle diameter of the non-hydratable matrix particles is preferably 5 μm or more, more preferably 8 μm or more, particularly preferably 10 μm or more (for example, 12 μm or more). The average particle diameter of the non-hydratable matrix particles may be about 50 μm or less. For example, the non-hydratable matrix particles having the average particle diameter of 5 μm or more and 50 μm or less (typically 10 μm or more and 30 μm or less) are preferable from the viewpoint of realizing both the moldability and a high strength.

The content of the non-hydratable matrix particles in the powder for layer manufacturing is not particularly limited, but is usually 80 parts by mass or more when the total amount of the powder for layer manufacturing is 100 parts by mass. From the viewpoint of, for example, improving mechanical strength, the content of the non-hydratable matrix particles is preferably 82 parts by mass or more, more preferably 84 parts by mass or more, for example, 86 parts by mass or more, and typically 88 parts by mass or more. The upper limit of the content of the non-hydratable matrix particles is not particularly limited, but is preferably 99 parts by mass or less, more preferably 98 parts by mass or less, for example, 96 parts by mass or less. Within this range of the content of the non-hydratable matrix particles, the effect of the present configuration can be exhibited at a higher level.

In the technique disclosed herein, the water-soluble adhesive particles and the non-hydratable matrix particles do not adhere to each other and may be present as independent particles. As a result of the water-soluble adhesive particles and the non-hydratable matrix particles being present as independent particles, as described above, a desired powder for layer manufacturing can be easily realized. Alternatively, the water-soluble adhesive particles may be adhered to the surface of the non-hydratable matrix particles. That is, the non-hydratable matrix particles may be partially or entirely covered (coated) with the water-soluble adhesive particles. As a result, since the required amount of the water-soluble adhesive particles is present between the non-hydratable matrix particles, water in which the water-soluble adhesive particles have been dissolved efficiently spreads among the non-hydratable matrix particles. Therefore, the effect of improving the strength of the layered shaped article can be more effectively exhibited.

The powder for layer manufacturing disclosed herein may further include, as necessary, known additives that can be used for a powder for layer manufacturing, such as a dispersant, a thickener, a printing aid, and the like, as long as the effect of the present composition is not impaired. The content of the above additives may be appropriately set according to the purpose of the addition, and since it does not characterize the present invention, a detailed description thereof will be omitted herein.

A method for preparing the powder for layer manufacturing disclosed herein is not particularly limited. For example, the components contained in the powder for layer manufacturing may be mixed by using a well-known mixing method such as polymix. The mode of mixing these components is not particularly limited, and for example, all the components may be mixed at once or may be mixed in a properly set order.

The powder for layer manufacturing disclosed herein can be used for layer manufacturing by mixing a shaping liquid including water with at least a part of a thin layer of the powder for layer manufacturing that has been loaded as a layer, solidifying, and repeatedly laminating the solidified thin layer, thereby manufacturing a layered shaped article. The shape of the layered shaped article to be shaped is not particularly limited. The powder for layer manufacturing disclosed herein can be preferably used for shaping shaped articles of various layered shapes.

Shaping Liquid

The powder for layer manufacturing disclosed herein is typically used for shaping a layered shaped article in the form of a mixture with the shaping liquid including water. The solvent used for the shaping liquid may include water. As the solvent, pure water, ultrapure water, ion exchanged water (deionized water), distilled water and the like can be preferably used. The shaping liquid disclosed herein may further include, as necessary, an organic solvent (a lower alcohol, a lower ketone, and the like) that can be uniformly mixed with water. Usually, it is preferable that water take 40% by volume or more, more preferably 50% by volume or more (typically 50% by volume to 100% by volume) of the solvent contained in the shaping liquid. Such a shaping liquid can be mixed at a ratio of, for example, 20 parts by mass to 80 parts by mass (typically 40 parts by mass to 60 parts by mass) with respect to 100 parts by mass of the powder for layer manufacturing at the time of shaping.

The shaping liquid disclosed herein may further include, as necessary, known additives which can be used for shaping liquids, such as a dye, an organic pigment, an inorganic pigment, a wetting agent and a flow rate increasing agent, as long as the effect of the present composition is not impaired. The content of the above additives may be appropriately set according to the purpose of the addition, and since it does not characterize the present invention, a detailed description thereof will be omitted.

Shaping Method

The powder for layer manufacturing disclosed herein can be used for shaping (manufacturing) a layered shaped article in a manner including, for example, the following operations. A preferred embodiment of a method for shaping a layered shaped article using the powder for layer manufacturing disclosed herein will be described hereinbelow. This shaping can be carried out by using a 3D printer which forms three-dimensional articles on the basis of three-dimensional data or the like corresponding to the layered shaped article to be shaped. Such a 3D printer may have an ink jet for dripping a shaping liquid including water and a mounting table on which a powder for layer manufacturing is disposed.

When shaping a layered shaped article, any of the powders for layer manufacturing disclosed herein is prepared. The preparation of the powder for layer manufacturing includes mixing the components included in the powder for layer manufacturing by using a well-known mixing method such as polymix.

The layered shaped article is then shaped by sequentially layering the layer-like solid material by repeating the following operations 1 to 3.

Operation 1: the powder for layer manufacturing is loaded in the form of a layer on a table so as to have a thickness (for example, 0.01 mm to 0.3 mm) corresponding to each layer of the layered shaped article to be shaped.

Operation 2: a shaping liquid including water is dropped from the inkjet head to the portion to be solidified (that is, a portion corresponding to a part of the layered shaped article to be shaped) in the powder for layer manufacturing which has been loaded in the form of a layer. The water-soluble adhesive particles contained in the portion onto which the shaping liquid has been dropped are dissolved and the non-hydratable matrix particles the layered are bonded to each other, thereby forming (solidifying) a layer-like solid material.

Operation 3: the table is lowered vertically downward by the thickness corresponding to each layer of the layered shaped article.

After that, shaping of the layered shaped article is completed by finally removing the powder for layer manufacturing which has not solidified. The layered shaped article formed using the powder for layer manufacturing disclosed herein may be calcined after shaping. The temperature of the calcination is not particularly limited, and is preferably in the range of, for example, 600° C. to 1800° C. As a result, a layered shaped article of higher strength can be formed.

Method for Manufacturing Layered Shaped Article

The technique disclosed herein may include, for example, providing a method for manufacturing a layered shaped article. That is, according to the technique disclosed herein, there is provided a method for manufacturing a layered shaped article, including: a step of preparing a powder for layer manufacturing including non-hydratable matrix particles, and water-soluble adhesive particles, and a step of shaping a layered shaped article by mixing a shaping liquid including water in at least a part of a thin layer of the powder for layer manufacturing which has been loaded in the form of a layer, solidifying, and repeatedly layering the solidified thin layer. In the method for manufacturing a layered shaped article, in the step of preparing the powder for layer manufacturing, the powder for layer manufacturing is prepared which includes, as the water-soluble adhesive particles, polyvinyl alcohol resin particles with a saponification degree of 86.5 mol % to 89.0 mol %, an average degree of polymerization of 400 to 600, a viscosity of a 4 mass % aqueous solution at 20° C. of 4.6 mPa to 5.4 mPa, and an average particle diameter of 20 μm to 60 μm. The above manufacturing method can be carried out by suitably using the contents of the powder for layer manufacturing and the shaping method disclosed herein. The above-described manufacturing method provides a high-quality layered shaped article excellent in mechanical strength as compared with the conventional layered shaped articles.

Hereinafter, some examples relating to the present invention will be described, but the present invention is not intended to be limited to the examples.

Water-Soluble Adhesive Particles

A plurality of types of water-soluble adhesive particles different in material and average particle diameter was prepared. The types and average particle diameters of the water-soluble adhesive particles of each example are shown in Table 1. The average particle diameter of the water-soluble adhesive particles was adjusted by pulverizing the particles by using a pot mill. PVA-205S (saponification degree: 86.5 mol % to 89.0 mol %, average degree of polymerization: 500, viscosity of 4 mass % aqueous solution at 20° C.: 4.6 mPa to 5.4 mPa) manufactured by Kuraray Co., Ltd. was used as the PVA. ISOBAM 104 manufactured by Kuraray Co., Ltd. was used as an isobutylene polymer. SM-25 manufactured by Shin-Etsu Chemical Co., Ltd. was used as Metolose. A total of 10 g of a resin powder including each of these water-soluble adhesive particles individually was placed in a 100 ml disposable cup, and subjected to a moisture resistance test under the aforementioned exposure conditions. After the moisture resistance test, the resin powder was sieved under the aforementioned vibration conditions by using a test sieve with a mesh opening size of 300 μm, and the mass proportion of the resin powder remaining on the sieve (=[(mass of the resin powder remaining on the sieve)/(total mass (10 g) of the used resin powder)]×100) was calculated. The obtained results are shown in the column of "300 μm sieve" in Table 1. It can be said that the less the resin powder remaining on the sieve, the less the moisture absorption (and therefore the solidification and coagulation) of the resin powder during the moisture resistance test, and the moisture resistance is satisfactory.

TABLE 1

| | | Water-soluble adhesive particles | | Shaping powder | | |
| --- | --- | --- | --- | --- | --- | --- |
| | Kind | Average particle diameter (μm) | 300 μm sieve (%) | Average particle diameter (μm) | 150 μm sieve (%) | Shaped article Strength (MPa) |
| Example 1 | PVA | 102 | 96.5 | 29 | 8.6 | 0.4 |
| Example 2 | PVA | 56 | 29.2 | 20 | 0.1 | 1.7 |
| Example 3 | PVA | 20 | 28.3 | 18 | 0.1 | 1.6 |
| Example 4 | PVA | 16 | 69.3 | 16 | 7.2 | 1.8 |
| Example 5 | Isobutylene resin | 232 | 100 | 14 | 83.1 | 3.1 |
| Example 6 | Isobutylene resin | 48 | 100 | 29 | 80.1 | 2.7 |
| Example 7 | Isobutylene resin | 2 | 100 | 38 | 79.6 | 1.8 |
| Example 8 | Xanthan gum | 49 | 99.9 | 20 | 93.5 | 0.2 |
| Example 9 | Arabia gum | 53 | 100 | 21 | 89.6 | 0.2 |
| Example 10 | Metolose | 58 | 0.2 | 24 | 0.1 | 0.5 |
| Example 11 | VisiJet | — | — | 51 | 0.2 | 1.2 |

As shown in Table 1, in Example 2 using PVA having an average particle diameter of 56 μm, the proportion of the resin powder remaining on the sieve was less than 30%, and satisfactory results were obtained in terms of moisture resistance.

Powder for Layer Manufacturing

The water-soluble adhesive particles of each example and alumina particles (average particle diameter 15 μm) as the non-hydratable matrix particles were weighed so as to have a mass ratio of 10:90, and mixed and stirred for 30 sec by polymix to prepare a shaping powder (powder for layer manufacturing) according to each example. The average particle diameter of the shaping powder according to each example is shown in Table 1.

Moisture Resistance Test

Further, the shaping powder of each example was placed in a 100 ml disposable cup, and a moisture resistance test was performed under the aforementioned exposure conditions. After the moisture resistance test, the shaping powder was sieved under the aforementioned vibration conditions by using a test sieve with a mesh opening size of 150 μm, and the mass proportion of the shaping powder remaining on the sieve (=[(mass of the shaping powder remaining on the sieve)/(total mass of the used shaping powder)]×100) was calculated. The obtained results are shown in the column of "150 μm sieve" in Table 1. It can be said that the less the shaping powder remaining on the sieve, the less the moisture absorption (and therefore the solidification and coagulation) of the shaping powder during the moisture resistance test, and the moisture resistance is satisfactory.

Measurement of Three-Point Bending Strength

A shaped body (layered shaped article) was shaped using the shaping powder of each example. Specifically, a test piece that was 4 mm long×40 mm wide×3 mm thick was shaped using ProJet 460 Plus manufactured by 3D Systems, Inc., and dried at room temperature for 24 h. Then, the three-point bending strength of the test piece was measured by a method according to JIS R 1601 by using a universal tester manufactured by Shimadzu Corporation. The obtained results are shown in the "Strength" column in Table 1. Here, the shaped body having a bending strength of 1.5 MPa or more was determined to be a quality product.

As shown in Table 1, in Examples 1 to 4, PVA with a saponification degree of 86.5 mol % to 89.0 mol %, an average degree of polymerization of 400 to 600, and a viscosity of a 4 mass % aqueous solution of 4.6 mPa to 5.4 mPa was used as the water-soluble adhesive particles. When such PVA was used as the water-soluble adhesive particles, in Example 4 using the PVA particles having an average particle diameter of 16 μm, PVA absorbed a large amount of moisture in the moisture resistance test and bonded the alumina particles together. As a result, the proportion of the shaping powder remaining on the sieve exceeded 7%. Further, in Example 1 using the PVA particles having an average particle diameter of 102 μm, although the absorption of moisture by PVA in the moisture resistance test was small, since the PVA particles themselves were large, the proportion of the shaping powder remaining on the sieve exceeded 8%. In addition, the strength of the shaped article was lower than 1.5 MPa. In contrast, in Example 2 using the PVA particles having an average particle diameter of 56 μm and in Example 3 using the PVA particles having an average particle diameter of 20 μm, the amount of the shaping powder remained on the sieve was smaller than that in Examples 1 and 4, and moisture resistance was satisfactory. Satisfactory results were also obtained for the strength of the shaped article.

Meanwhile, in Examples 5 to 7, an isobutylene resin was used as the water-soluble adhesive particle. With the shaping powders of Examples 5 to 7, satisfactory results were obtained for the strength of the shaped article regardless of the average particle diameter, but in the moisture resistance test, the powdered surface solidified, so that a large amount of the shaping powder remained on the sieve. In Examples 8 to 10, resins other than PVA and the isobutylene resin were used. With the shaping powders of Examples 8 to 10, although the average particle diameter of the water-soluble adhesive particles was 20 μm to 60 μm, the strength of the shaped article tended to decrease. Further, in Examples 8 and 9, a large amount of the shaping powder remained on the sieve and the moisture resistance was poor. These results indicate that the effect of improving the strength of the shaped article and the effect of improving the moisture resistance by setting the average particle diameter of the water-soluble adhesive particles to 20 μm to 60 μm is exhibited particularly effectively when using a PVA resin with a saponification degree of 86.5 mol % to 89.0 mol %, an average degree of polymerization of 400 to 600, and a viscosity of a 4 mass % aqueous solution of 4.6 mPa to 5.4 mPa as the water-soluble adhesive particles.

Although specific examples of the present invention have been described in detail hereinabove, they are merely examples and do not limit the scope of the claims. The techniques set forth in the claims are inclusive of various modifications and changes of the specific examples exemplified hereinabove.

What is claimed is:

1. A powder for layer manufacturing, comprising:
   non-hydratable matrix particles; and
   water-soluble adhesive particles,
   the powder for layer manufacturing including, as the water-soluble adhesive particles, polyvinyl alcohol resin particles with a saponification degree of 86.5 mol % to 89.0 mol %, an average degree of polymerization of 400 to 600, a viscosity of a 4 mass % aqueous solution at 20° C. of 4.6 mPa to 5.4 mPa, and an average particle diameter of 20 μm to 60 μm.

2. The powder for layer manufacturing according to claim 1, wherein the average particle diameter of the non-hydratable matrix particles is 1 μm to 50 μm.

3. The powder for layer manufacturing according to claim 1, wherein, when the total mass of the powder for layer manufacturing is 100 parts by mass, the content of the water-soluble adhesive particles is 1 part by mass to 20 parts by mass.

4. The powder for layer manufacturing according to claim 1, wherein the non-hydratable matrix particles are constituted mainly by a metal including at least one element selected from the group consisting of Al, Zr, Ti, Zn, Ni, and Fe or an alloy thereof.

5. The powder for layer manufacturing according to claim 1, wherein the non-hydratable matrix particles are constituted mainly by an oxide including at least one element selected from the group consisting of Al, Zr, Ti, Zn, Ni, Fe, and Si.

6. A layered shaped article comprising a solidified product of the powder for layer manufacturing according to claim 1.

* * * * *